(12) United States Patent
Moller

(10) Patent No.: US 11,091,928 B2
(45) Date of Patent: Aug. 17, 2021

(54) VEHICLE MOUNTED AWNING

(71) Applicant: Scot R. Moller, Robstown, TX (US)

(72) Inventor: Scot R. Moller, Robstown, TX (US)

(*) Notice: Subject to any disclaimer, the term of this patent is extended or adjusted under 35 U.S.C. 154(b) by 0 days.

(21) Appl. No.: 16/853,705

(22) Filed: Apr. 20, 2020

(65) Prior Publication Data
US 2020/0339027 A1 Oct. 29, 2020

Related U.S. Application Data

(60) Provisional application No. 62/838,259, filed on Apr. 24, 2019.

(51) Int. Cl.
*E04H 15/06* (2006.01)
*B60P 3/34* (2006.01)
*B60J 7/12* (2006.01)

(52) U.S. Cl.
CPC ............ *E04H 15/06* (2013.01); *B60J 7/12* (2013.01); *B60P 3/343* (2013.01)

(58) Field of Classification Search
CPC ...................................................... E04H 15/06
See application file for complete search history.

(56) References Cited

U.S. PATENT DOCUMENTS

| | | | | |
|---|---|---|---|---|
| 3,773,379 A * | 11/1973 | Loiseau | .......... | B60P 7/04 296/107.09 |
| 4,310,194 A * | 1/1982 | Biller | .......... | B60P 3/32 135/88.13 |
| 4,519,409 A * | 5/1985 | Kinney | .......... | E04H 15/06 135/88.08 |
| 4,657,299 A * | 4/1987 | Mahan | .......... | B62D 33/0207 135/88.13 |
| 4,964,669 A * | 10/1990 | Geier | .......... | B60J 7/1265 135/88.09 |
| 5,238,288 A * | 8/1993 | Chandler | .......... | B60J 7/104 135/129 |
| 5,335,960 A * | 8/1994 | Benignu, Jr. | .......... | B60P 3/341 135/88.05 |
| 5,601,104 A * | 2/1997 | Perkins | .......... | E04H 15/06 135/88.03 |
| 5,660,425 A * | 8/1997 | Weber | .......... | E04H 15/06 135/88.01 |
| D409,763 S * | 5/1999 | Rogers | .......... | D25/56 |
| 6,202,664 B1 * | 3/2001 | Shenton, Jr. | .......... | E04H 15/06 135/88.01 |
| 6,227,592 B1 * | 5/2001 | Thacker | .......... | B60J 7/1614 296/100.08 |
| 6,394,118 B1 * | 5/2002 | Cikanowick | .......... | E04H 15/06 135/115 |
| 6,481,784 B2 | 11/2002 | Cargill | | |
| 6,666,490 B1 * | 12/2003 | Thacker | .......... | B60J 7/1614 296/100.08 |
| 7,059,660 B1 * | 6/2006 | Juola | .......... | E04H 15/06 135/88.01 |

(Continued)

*Primary Examiner* — David R Dunn
*Assistant Examiner* — Danielle Jackson
(74) *Attorney, Agent, or Firm* — G. Turner Moller

(57) ABSTRACT

An awning is mounted in stake pockets of a truck bed and casts shade asymmetrically relative to its mount rearwardly toward the truck tailgate. The awning is braced by struts connecting the truck and the awning. The awning is pivoted between a stowed position overlying the truck rails to a position extending rearwardly of the truck bed.

18 Claims, 5 Drawing Sheets

(56) References Cited

U.S. PATENT DOCUMENTS

| | | | |
|---|---|---|---|
| 7,147,265 B1 * | 12/2006 | Schmeichel | B60J 7/102 |
| | | | 296/100.14 |
| 7,481,480 B2 * | 1/2009 | Thacker | B60J 7/1614 |
| | | | 296/100.06 |
| 7,568,491 B2 * | 8/2009 | Banfill | E04H 15/06 |
| | | | 135/117 |
| D624,486 S * | 9/2010 | Shipp, Jr. | D12/412 |
| 7,789,097 B1 | 9/2010 | Sotirkys | |
| 8,123,190 B2 | 2/2012 | Kost | |
| 9,096,291 B2 * | 8/2015 | Perosino | F16B 1/00 |
| 9,127,475 B2 | 9/2015 | LeAnna | |
| 9,194,152 B1 * | 11/2015 | Plasencia | E04H 15/48 |
| 9,506,269 B2 * | 11/2016 | Armstrong | E04H 15/06 |
| 9,604,702 B2 * | 3/2017 | Hough | E04H 15/46 |
| 9,968,167 B2 | 5/2018 | Volin | |
| 10,029,547 B2 | 7/2018 | Dunn | |
| 10,145,140 B2 * | 12/2018 | Woodard | E04H 15/30 |
| 2011/0108076 A1 * | 5/2011 | Connot | E04H 15/06 |
| | | | 135/88.05 |
| 2011/0226297 A1 * | 9/2011 | Rewis | E04H 15/06 |
| | | | 135/88.05 |

* cited by examiner

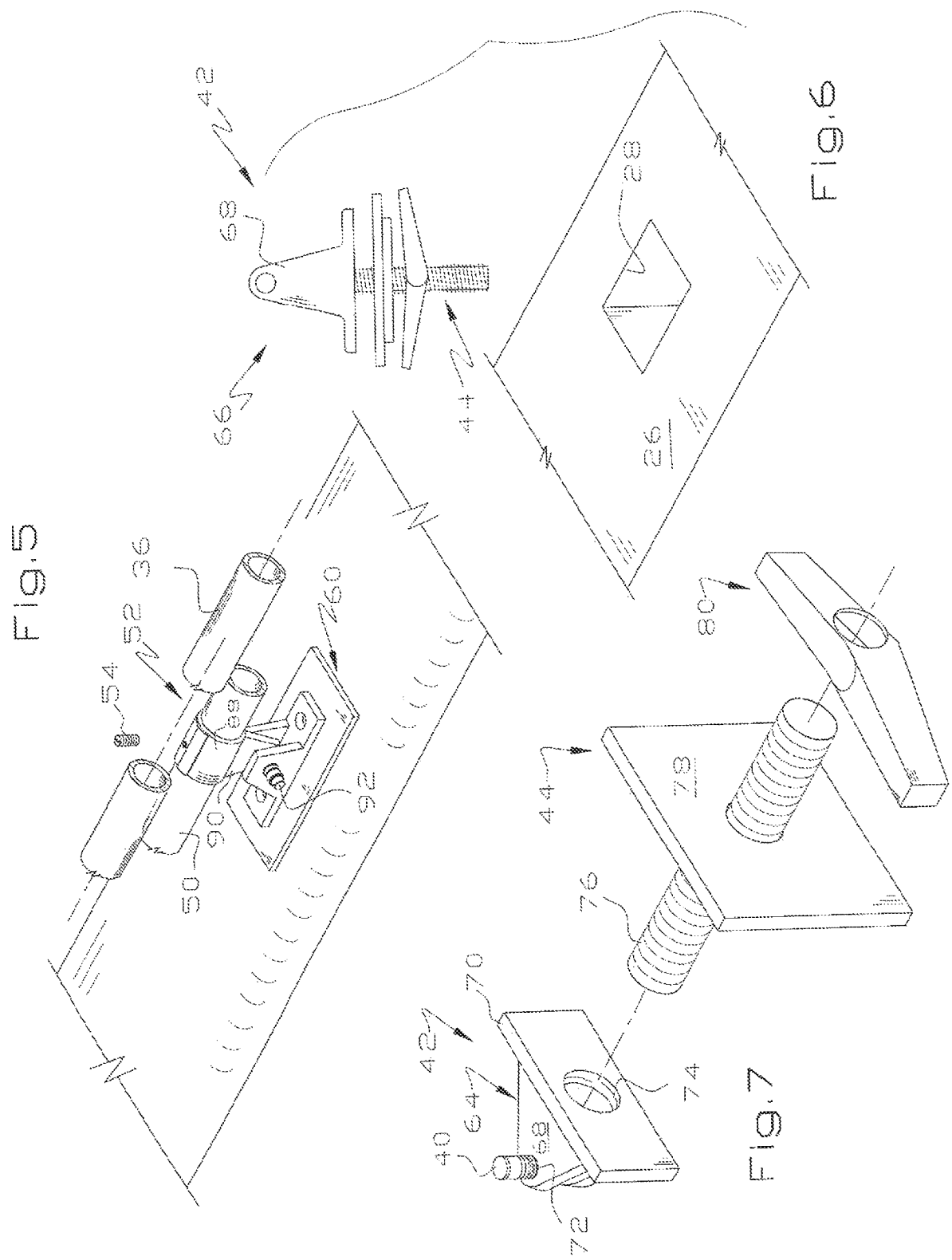

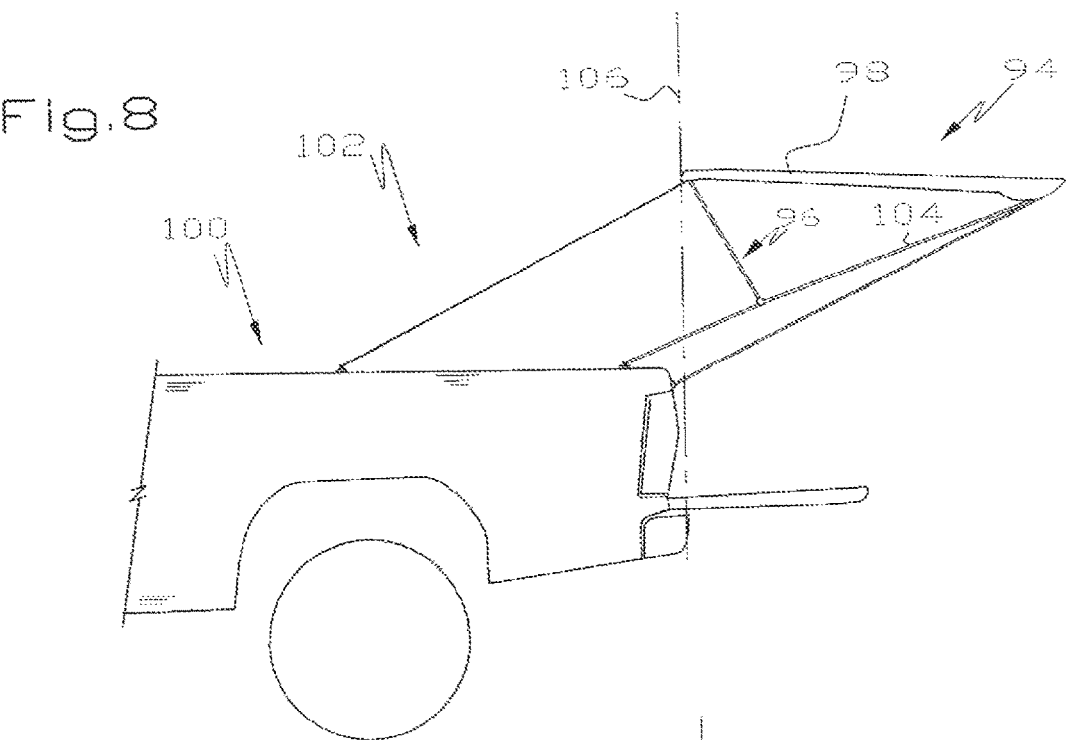
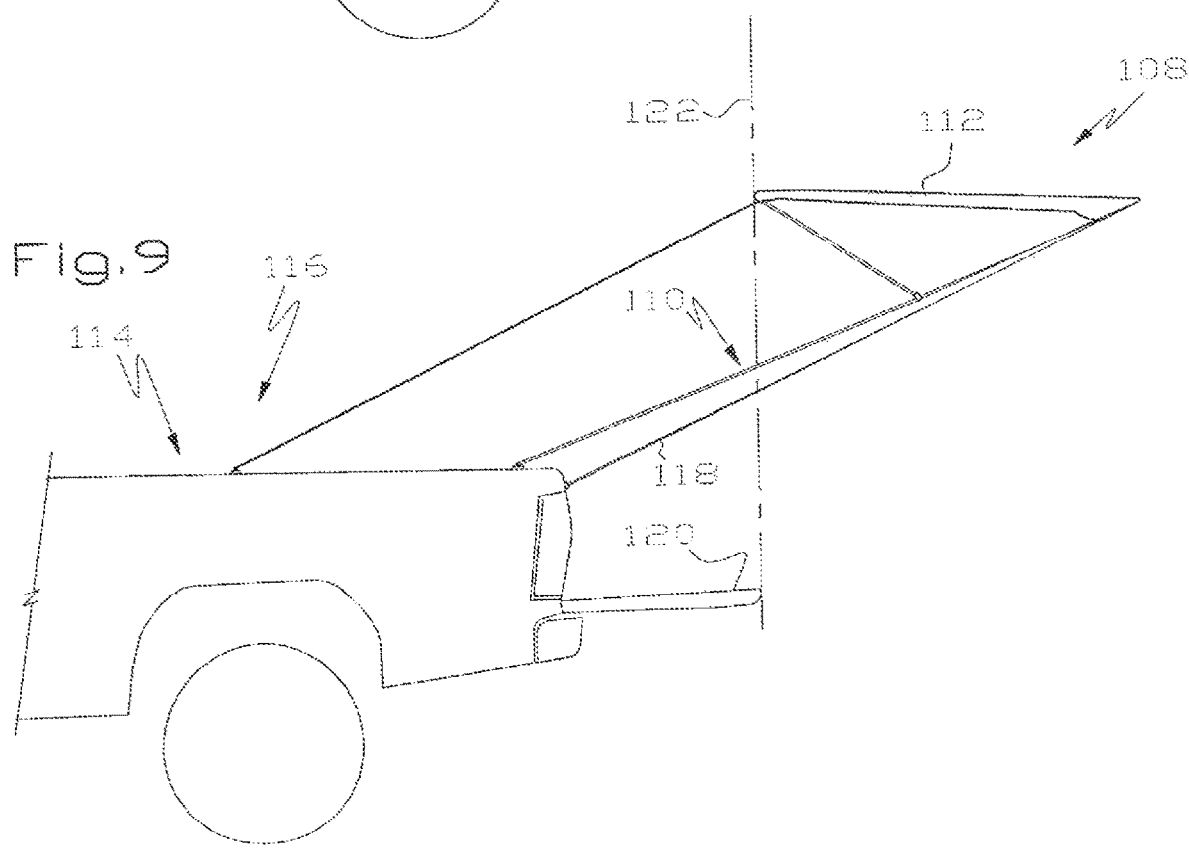

VEHICLE MOUNTED AWNING

This application is based on Provisional Patent Application 62/838,259, filed Apr. 24, 2019, priority of which is claimed and which is incorporated herein by reference.

This invention relates to a vehicle mounted awning and more particularly to a awning mounted on the rear of a truck.

BACKGROUND OF THE INVENTION

It occasionally occurs that it is desirable to work on, or near, the end of a truck. Often, these are work trucks such as welder's trucks but equally often they are standard pickup trucks. Standard pickup trucks are often used for either work or pleasure under circumstances where it is desirable to have an awning or canopy providing shade on or near the tailgate. Most current model pickup trucks include stake pockets in the rails of the truck bed. These pockets are used for a variety of applications including attaching tie down points or mounting a camper shell to the truck bed.

It is known in the prior art to provide an umbrella at the rear of welder's trucks. Similar disclosures are found in U.S. Pat. Nos. 6,481,784; 7,789,097; 8,123,190; 9,127,475; 9,506,269; 9,968,167 and 10,029,547.

SUMMARY OF THE INVENTION

An awning includes a frame and a sheet material cover. The frame may connect to the stake pockets of a conventional truck bed and extend rearwardly to overlie or extend beyond a tailgate thereby providing shade rearwardly of an open tailgate. The awning may provide shade not only on the tailgate but also rearwardly of the tailgate where individuals likely stand or sit. In some embodiments, the awning may provide all shade from vertical sunlight rearwardly of the truck bed or rearwardly of an open tailgate of the truck. One or more braces may connect the frame to the truck bed thereby stabilizing the frame against excessive movement, even in high winds.

BRIEF DESCRIPTION OF THE DRAWINGS

FIG. 5 is an enlarged partial view of the awning frame in a stowed position and illustrating a mounting fixture, certain parts being broken away for clarity of illustration;

FIG. 6 is an isometric view of a stake pocket and bracket used to attach the awning to a vehicle;

FIG. 7 is an enlarged view of a mount that fits in the stake pocket of the truck bed;

FIG. 8 is a side view of an embodiment of an awning casting all shade from vertical sunlight rearwardly of a truck bed; and FIG. 9 is a schematic view of another embodiment of an awning casting all shade from vertical sunlight rearwardly of an open tailgate.

DETAILED DESCRIPTION OF THE INVENTION

Figure 1:
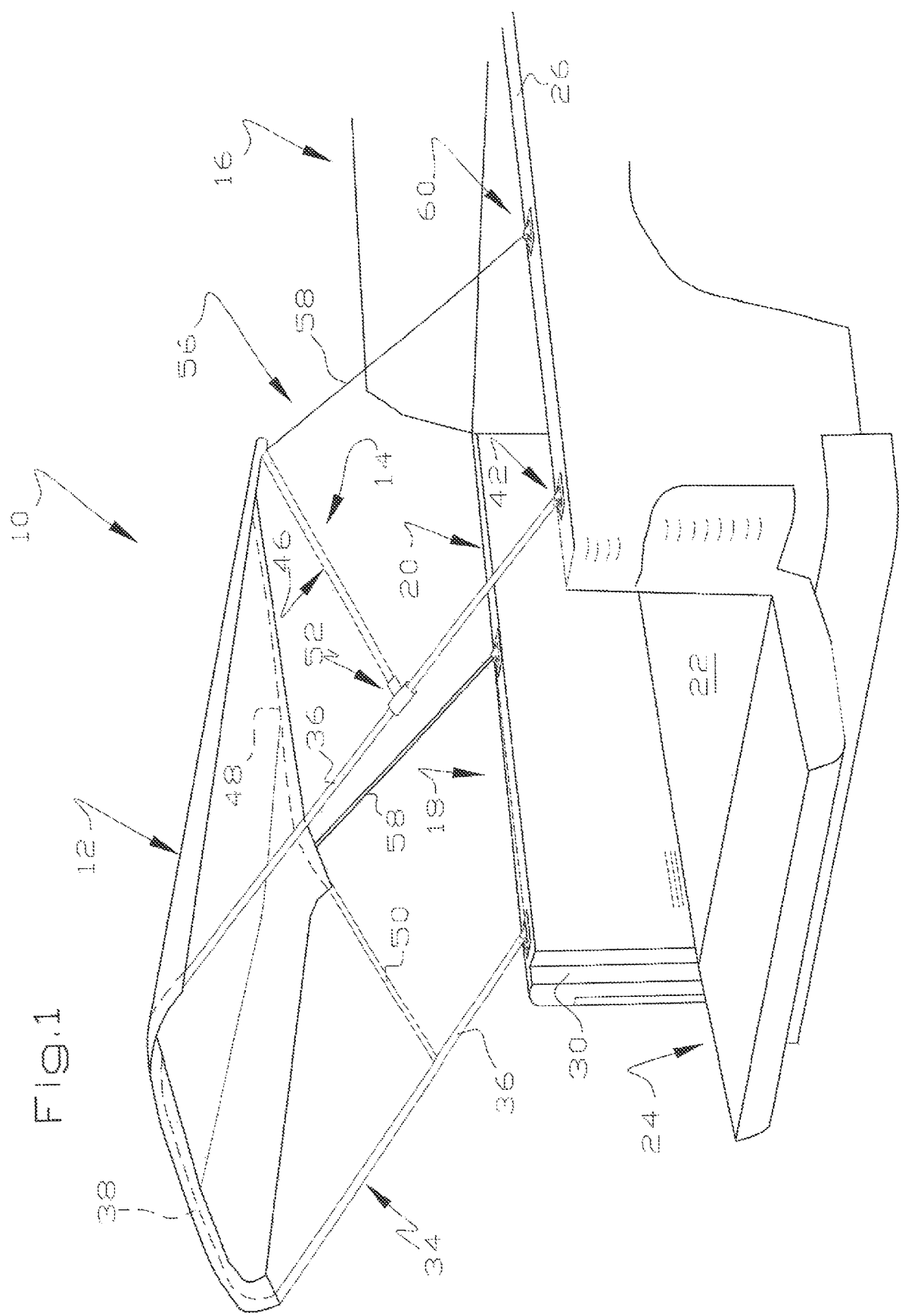
FIG. 1 is an isometric view from the right rear of a conventional pickup truck illustrating an awning disclosed herein.

The awning 10 includes a cover 12 supported by a frame 14 which is mounted on the rear of a truck 16. The truck 16 is illustrated as a conventional pickup truck having a truck bed 18 bounded by rails 20 and having a floor 22. A tailgate 24 may be pivotally mounted on the truck 16 to lie coplanar with the floor 22. The rails 20 may include a horizontal section 26 providing one or more upwardly opening conventional stake pockets 28. In its upright position, the tailgate 24 may nest inside a recess 30 provided by the rails 20. The tailgate 24 is conventionally latched in its upright position by a latch (not shown) on the tailgate 24 which cooperates with a stud 32 fixed to the truck 16 inside the recess 30. In some trucks, the stud 32 is a horizontally extending stub with an enlarged end. In other trucks, the stud 32 may be a U-shaped member fixed to the recess 30. Those skilled in the art will recognize the pickup truck 16 as being typical of currently available models.

The awning 10 may be of any suitable type and is illustrated as a bimini top common on small boats. The frame 14 may include a U-shaped support 34 having legs 36 and a crossbar 38. The support 34 may be one piece or in segments. The legs 36 are pivotally mounted for movement about an axis provided by pins 40 extending through a mount or a pair of brackets 42 secured in the stake pockets 28 by a connector 44. The frame 14 may also include a U-shaped strut 46 including a crossbar 48 and legs 50 receiving a sliding sleeve assembly 52 which may be temporarily fixed to the legs 36 by a set screw 54 as explained more fully hereinafter. The legs 36 and/or the legs 50 may be of one piece, segmented or telescoping in any suitable manner. Conventional bimini tops cast shade symmetrically relative to its pivotal mount analogous to the bracket 42. It will be seen the cover 12 casts a shadow from vertical sunlight asymmetric relative to the bracket 42 toward the rear of the truck bed and, in some embodiments, beyond the open tailgate 24 as discussed more fully hereinafter.

As so far disclosed, the awning 10 is unstable because it is freely moveable about the pivot axis of the pin 40 and requires some bracing 56 to stabilize it. The amount, position and angle of the bracing 56 depends on the distribution of weight of the awning 10 relative to the pin 40. It is advantageous for the awning 10 to cast shade from vertical sunlight on and/or rearwardly of the tailgate 24, i.e. rearward relative to the normal direction of movement of the truck 16. With most combinations of frame 14 and cover 12, this means a major fraction of the weight of the awning 10 is rearward of the pin 40 meaning the awning 10 tends to rotate clockwise as viewed in the position of FIG. 2. Thus the bracing 56 may include struts 58 secured to fittings 60 on the rail 20 of the truck 16 and to the frame 14 or to the cover 12. The bracing 56 may be of any suitable type including rigid material, elastic bands such as bungee cords, or the like and may preferably be conventional inelastic webbing including a length adjusting buckle (not shown) and suitable end connectors for securement to the fittings 60, the frame 14 and/or the cover 12.

In high wind or rain, it may be desirable to have additional bracing 62 stabilizing the awning 10. To this end, the bracing 62 may include a second set of struts 64 which likewise may be rigid, elastic bands, inelastic webbing or the like removably attached to the stud 32 with a key-hole connector (not shown) at one end and to the frame 14 or to the cover 12 at the opposite end. In the alternative, suitable tie downs or clips (not shown) may be attached inside the recess 30 and the bracing 62 removably attached to them.

Referring to FIGS. 5-7, the brackets 42 and connectors 44 are illustrated in more detail. The brackets 42 may be modified from commercially bimini top brackets available from Overton's Inc. of Lincolnshire, Ill. and include a conventional housing 66 having spaced apart ears 68 extending from a base plate 70. The pin 40 is mounted in aligned openings in the ears 68 and includes a spring 72 biasing the pin 40 outwardly out of a position in the gap between the ears 68 so the frame 14 can be removed from the truck 16 and a normal position spanning the distance between the ears 68 for captivating the pin 40 between the ears 68. The pin 40 may be of conventional design including a pivoted end (not shown), hidden in FIG. 7, movable between a position coaxial with the pin 40 so the pin 40 can be removed from the bracket 42 and a trans-verse position captivating the pin 40 in the bracket 42. In a preferred embodiment, the connector 44 secures the bracket 42 in the stake pocket 28. The bracket 42 accordingly may include a threaded opening 74 (FIG. 7) provided in the housing 66 into which is placed a screw 76 comprising part of the connector 44.

The connector 44 is designed to be secured inside the stake pocket 28. The connector 44 may include a clamped plate 78 providing a base larger than the base plate 70 to provide a large surface area contacting the horizontal surface 26 of the rail 20 or to a lip of the stake pocket 28. A conventional toggle assembly 80 is threaded onto the screw 76. To attach the bracket 42 to the stake pocket 28, the housing 66 and plate 78 are positioned on top of the rail 20 and the toggle assembly 80 and screw 76 passed into the stake pocket 28. The bracket 42 is rotated to advance the toggle assembly 80 into load bearing engagement with a lip (not shown) of the stake pocket 28. This clamps the housing 66 and the plate 78 to the rail 20 and secures the bracket 42 to the stake pocket 28.

Figure 2:
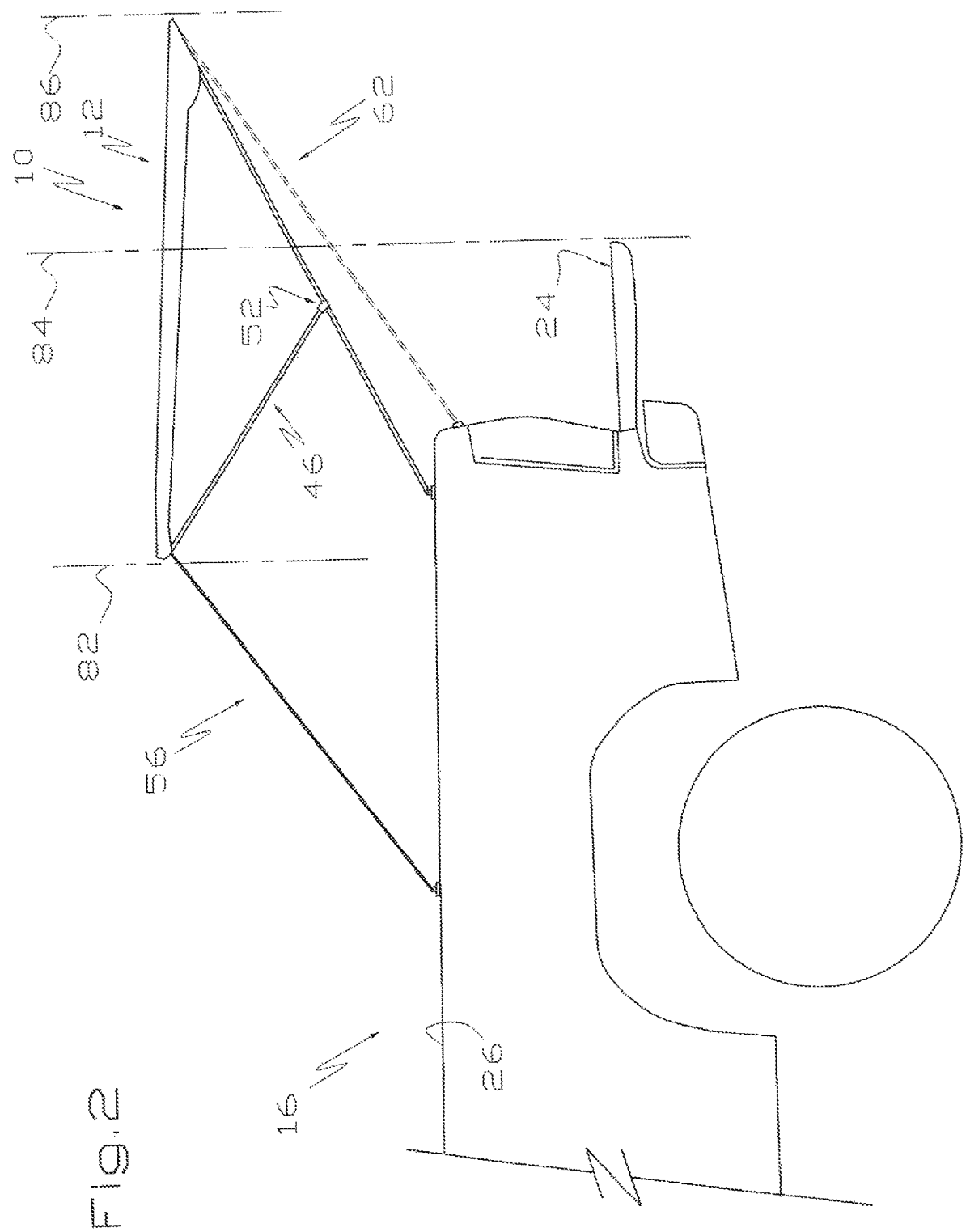
FIG. 2 is a side view of the vehicle and awning of FIG. 1 illustrating an embodiment with an additional set of braces.
Figure 3:
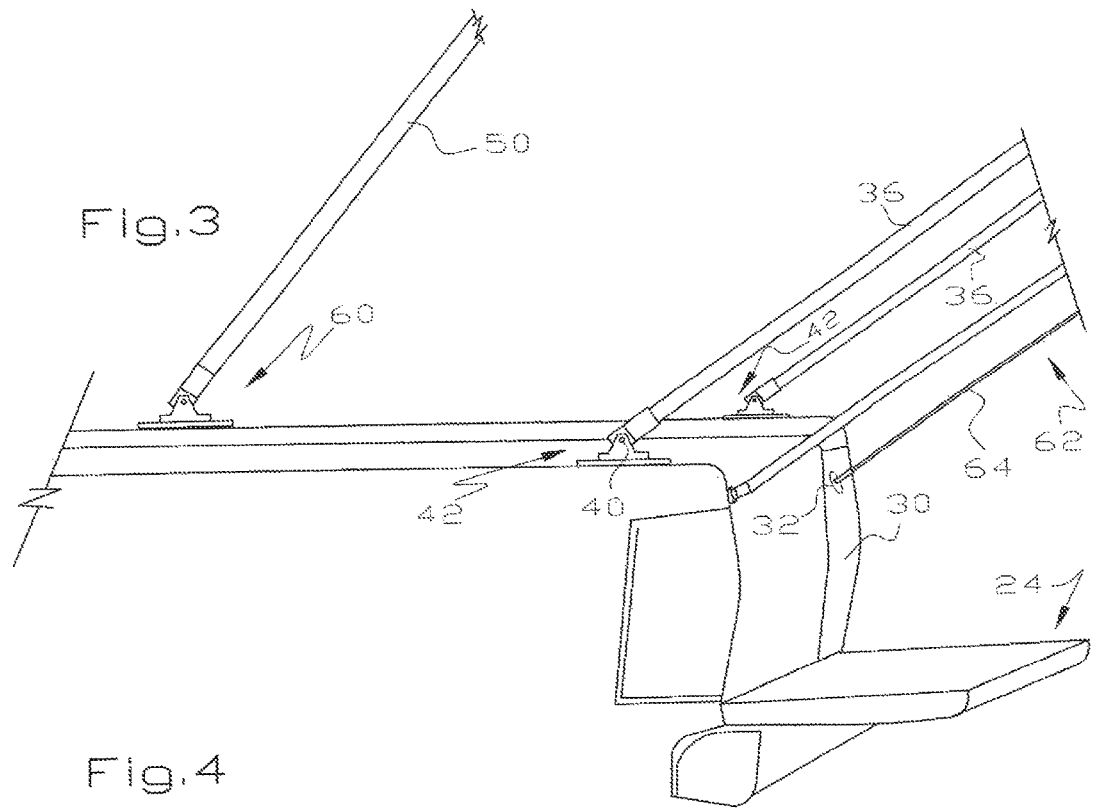
FIG. 3 is an isometric view from the left rear of the pickup of FIG. 1 illustrating the awning in a deployed configuration.

As shown in FIGS. 1-3, the fittings 60 provide an anchor for the bracing 64. The fittings 60 may be essentially the same as the bracket 42 and are secured in any suitable manner to the truck rail 20, preferably in another stake pocket (not shown) by a screw and toggle assembly similar to the screw 76 and toggle assembly 80. In other embodiments, the fitting 60 may be secured to the truck rail 20 by drilling a suitable hole (not shown) in the horizontal section 26 and securing the fitting 60 with the screw and toggle assembly. One advantage of the fitting 60 will become more fully apparent hereinafter.

As an alternative to securing the brackets 42 to the stake pockets 28, the brackets 42 may be secured to the bed rails 20 using either conventional screws to secure the base plate 70 to the rail 20.

The cover 12 may be of any suitable material capable of casting a shadow. Bimini top material has proven satisfactory and is available from Overton's Inc. The cover 12 is secured to the frame 14 in a conventional manner.

An important advantage of this invention is the ability to provide shade from vertical sunlight rearwardly of the tailgate 24 where people are apt to stand or sit. The amount of shade from vertical sunlight rearwardly of the tailgate 24 is a function of the length of the legs 36 and the angle of the legs 36 relative to the ground or to the truck 16. At least 30% of the cover 12 may be rearwardly of the open tailgate 24 and, as shown by a comparison of the distance between the vertical dash-dot lines 82, 84, 86 in FIG. 2. It may preferred that at least 50% of the cover 12 may provide shade from vertical sunlight rearwardly of the tailgate 24. As shown in FIG. 2, a substantial majority. i.e. at least 60% of a length of the cover, of shade cast by vertical sunlight is rearward of the truck bed 16. Even though the frame 14 may be overly complicated and expensive, there is no upper limit of the amount of the cover 12 that may be rearwardly of the tailgate 24.

Figure 4:
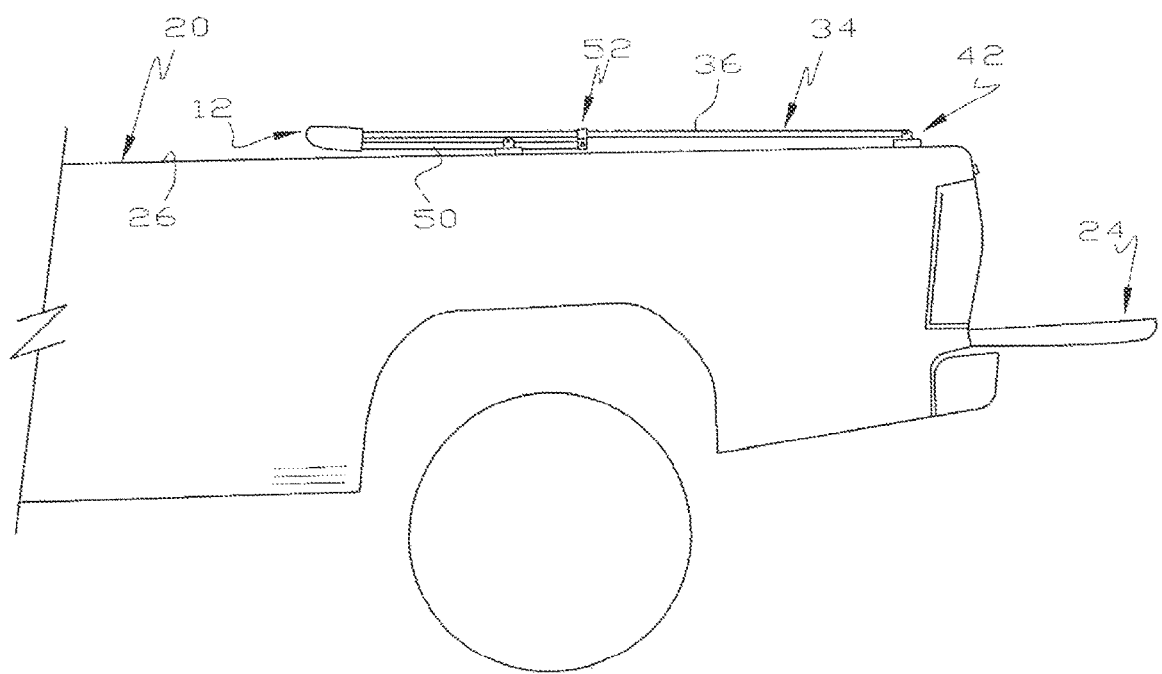
FIG. 4 is a view from one side of a vehicle illustrating the awning in a stowed position.

The awning 10 may be stowed against the rails 20 of the truck 16 as shown in FIGS. 4 and 5. A boot (not shown) is used to enclose the cover 12 in the stowed position and keep it from flapping. This has the additional advantage of captivating the legs 36 and preventing the U-shaped support 34 from moving. The fitting 60 advantageously cooperates with the sleeve assembly 52 to secure the frame 14 to the bed rail 20. The sleeve assembly 52 includes a sleeve 88 slidably mounted on each leg 50 and secured in place by the set screw 54. The sleeve assembly 52 includes a single tab 90 having an opening (not shown) therein receiving a spring actuated pin 92 and thereby captivate the sleeve assembly 52 to the fitting and thereby captivate the frame 14 to the bed rail 20.

Many current model pickup trucks have stake pockets on each rail 20 spaced at a distance conducive to sizing and positioning the awning 10 in a desirable location. For example, with appropriately positioned stake pockets and appropriately sized members 34, 46, the sleeve assemblies 52 can be secured correctly by simply folding the support 34 and strut 46 to their stowed position and securing the sleeve assemblies 52 with the set screws 54. Some pickups have only one appropriately positioned stake pocket at the rear of each rail 20 so the position of the fittings 60 may be set either by varying the position of the fittings 60 or by varying the length and angle of the braces 54.

To deploy the cover 12 from a stowed position of the awning 10 shown in FIG. 4, the frame 14 is released from the fittings 60 by manipulating the pins 92 and releasing the frame 14 for movement. The U-shaped support 34 is pivoted clockwise in FIG. 2 and the sleeve assemblies 52 slide along the legs 36 and the U-shaped support 46 and the bracing 56 is installed to position the cover 12 at a desired location. The sleeve assemblies 52 are fixed to the legs 36 by tightening the set screws 54. The additional bracing 62 may be added as desired. To move the awning 10 from the extended position of FIGS. 1-2 back to the stowed position of FIG. 4 is basically the reverse.

Referring to FIG. 8, an awning 94 includes a frame 96 and a cover 98 mounted on a bed 100 of a truck 102. The frame 96 includes legs 104 of sufficient length and at a sufficient angle to the truck 102 to position the cover 98 so the cover 98 casts shade from vertical sunlight entirely rearwardly of the truck bed 102 as suggested by the vertical line 106. In such an embodiment, it may be desirable that the legs 104 be multipart or telescoping.

Referring to FIG. 9, an awning 108 includes a frame 110 and a cover 112 mounted on a bed 114 of a truck 116. The frame 110 includes legs 118 of sufficient length and at a sufficient angle to the truck 116 to position the cover 112 so the cover 112 casts shade from vertical sunlight entirely rearwardly of an open tailgate 120 the truck bed 114 as suggested by a vertical line 122. In such an embodiment, it may be desirable that the legs 118 be multipart or telescoping.

Although this invention has been disclosed and described in its preferred form with a certain degree of particularity, it is understood that the present disclosure of the preferred form is only by way of example and that numerous changes in the details of operation and in the combination and arrangement of parts may be resorted to without departing from the spirit and scope of the invention.

I claim:

1. An awning for a truck having a truck bed bounded by rails and a tailgate movable between an upright closed position and a horizontal open position, comprising:
   a frame and a mount, the frame and mount being configured to pivotally attach the frame to the truck rails for movement from a first inclined position extending from the truck rails past the open tailgate and a second stowed position; and
   a cover mounted on the frame, the frame and cover being configured, in the first inclined position, to position at least a majority of the cover rearwardly of the open tailgate of the truck.

2. The awning of claim 1 wherein the frame and cover being configured to position at least 60% of the cover rearwardly of the truck bed.

3. The awning of claim 1 wherein the truck includes stake pockets in the rails and the mount being configured to be installed in the stake pockets.

4. The awning of claim 1 further comprising bracing, wherein the bracing comprises bodily flexible struts connecting the truck rails and the frame in the first inclined position of the frame.

5. The awning of claim 1 wherein the frame and cover are configured, in the first inclined position, to partly overlie the truck bed, partly overlie the open tailgate and partly extend rearwardly of the open tailgate.

6. An awning for a truck having a truck bed bounded by first and second truck rails and a tailgate movable between an upright closed position and a horizontal open position, comprising:
   a frame and a mount, the frame and mount being configured to pivotally attach the frame to the truck rails for movement from a first inclined position extending from the truck rails past the open tailgate and a second stowed position; and
   a cover mounted on the frame, the frame and cover being configured, in the first inclined position, to partly overlie the truck bed and partly extend rearwardly of the truck bed;
   the frame comprising a first U-shaped rigid support configured to attach to the cover and being configured to support the cover, the first U-shaped support having a first pair of legs and a first crosspiece connecting the first pair of legs, each leg of the first pair of legs being configured to overlie a respective truck rail in the second stowed position, a second U-shaped rigid support being configured to support the cover and slidably mounted on the first U-shaped rigid support and bracing being configured to connect the truck and the first U-shaped support, the second U-shaped support having a second pair of legs and a second crosspiece connecting the second pair of legs, each leg of the second pair of legs configured to overlie a respective truck rail in the second stowed positon.

7. The awning of claim 6 wherein the frame and cover being configured to extend past the open tailgate by at least 60% of a length of the cover.

8. The awning of claim 6 wherein the truck includes stake pockets in the rails and the mount being configured to be installed in the stake pockets.

9. The awning of claim 6 wherein the bracing comprises bodily flexible struts connecting the truck rails and the frame in the first inclined position of the frame.

10. An awning for a truck having a truck bed bounded by a tailgate movable between a vertical closed position and an open position and rails having upright sides and a top, comprising:
    a frame and a mount, the frame and mount being configured to pivotally attach the frame to the truck rails for movement about only one axis from a first inclined position extending from the truck rails past the open tailgate and a second stowed position, a majority of the weight of the awning in the first inclined position being rearward of the axis; and
    a cover mounted on the frame, the cover and frame being configured to position the cover at least partially rearward of the buck bed, the cover being of sheet material;
    the frame comprising:
    a first U-shaped rigid support configured to support the cover, the first U-shaped support including a first pair of legs, each leg of the first pair of legs being configured, in the second sowed position, to overlie a respective truck rail and a first crosspiece extending between the first pair of legs;
    a second U-shaped rigid support configured to support the cover, the second U-shaped support having a second pair of legs and a second crosspiece connecting the second pair of legs, each leg of the second pair of les being configured to overlie a respective truck rail in the second stowed position; and
    bracing configured to connect the truck and the frame and stabilize the frame in the first inclined position, the bracing comprising at least one first strut configured to connect the truck and the first U-shaped support and at least one second strut configured to connect the truck and the second U-shaped support, the struts being configured to be inclined upwardly from the truck bed to the U-shaped supports in the first inclined position of the frame.

11. The awning of claim 10 wherein the truck rails include stake pockets and the mount is configured to secure the frame in the stake packets.

12. The awning of claim 10 wherein the cover and frame being configured to position the cover asymmetrically of the axis toward the tailgate.

13. The awning of claim 10 wherein the struts are bodily flexible.

14. The awning of claim 13 wherein the struts are elastic.

15. The awning of claim 13 wherein the struts are inelastic.

16. The awning of claim 13 wherein there are two first struts, each first strut being configured to be on a respective one of the truck rails.

17. The awning of claim 16 wherein there are two second struts, each second strut being configured to be on a respective side of the truck bed.

18. The awning of claim 10 wherein the second U-shaped support is directly connected to the first U-shaped support.

* * * * *